June 25, 1957  E. F. HAUPTLI  2,797,124
VEHICLE BODY WITH ADJUSTABLE ROOF STRUCTURE
Filed Aug. 5, 1955  3 Sheets-Sheet 1
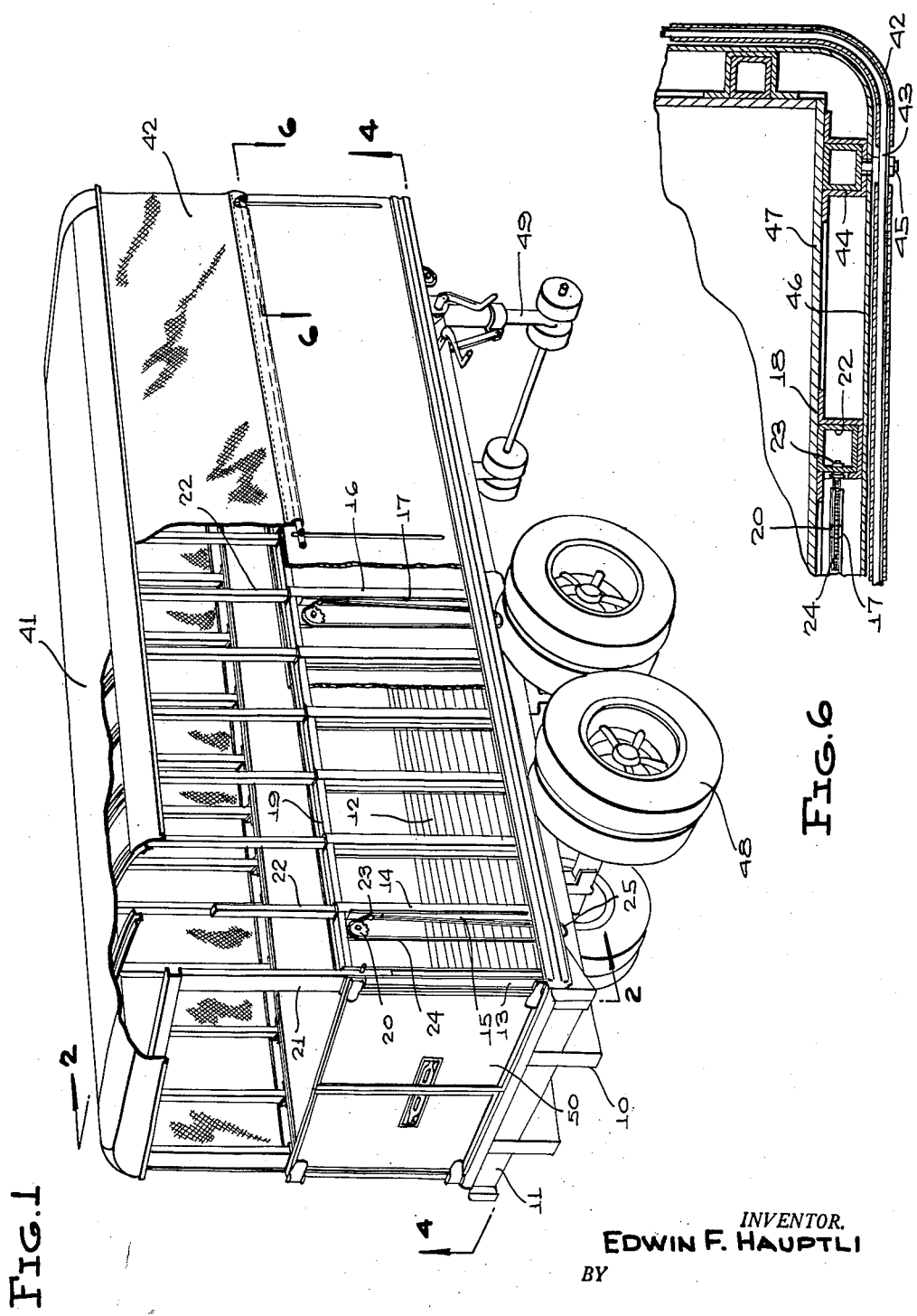
INVENTOR.
EDWIN F. HAUPTLI
BY
McMorrow, Berman & Davidson
ATTORNEYS

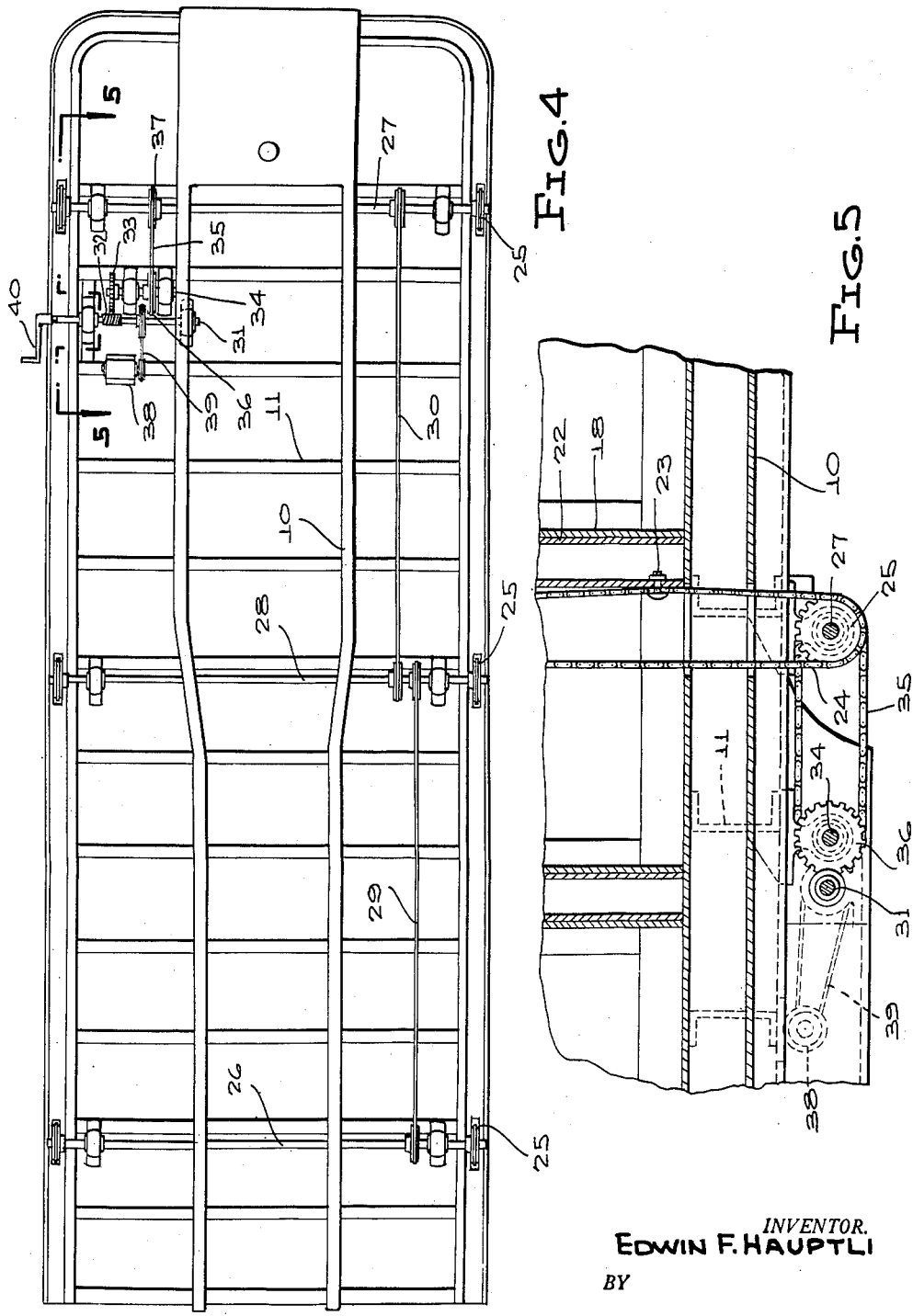

June 25, 1957 E. F. HAUPTLI 2,797,124
VEHICLE BODY WITH ADJUSTABLE ROOF STRUCTURE
Filed Aug. 5, 1955 3 Sheets-Sheet 3

INVENTOR.
EDWIN F. HAUPTLI
BY
McMorrow, Berman & Davidson
ATTORNEYS

United States Patent Office 2,797,124
Patented June 25, 1957

2,797,124
VEHICLE BODY WITH ADJUSTABLE ROOF STRUCTURE

Edwin F. Hauptli, Francesville, Ind.

Application August 5, 1955, Serial No. 526,694

2 Claims. (Cl. 296—26)

The present invention relates to a vehicle body having an adjustable roof structure.

The primary object of the present invention is to provide a vehicle body in which the roof is adjustable upwardly and downwardly so as to offer less resistance to the wind while moving and when empty or only partially loaded.

Another object of the present invention is to provide a vehicle body structure which is sturdy in construction, one economical to manufacture and assemble, and one which may be used for camping as well as for commerce, affording the occupant headroom permitting him to stand within the vehicle body when parked and maintaining a low outline offering less resistance to the wind while moving.

Figure 2:
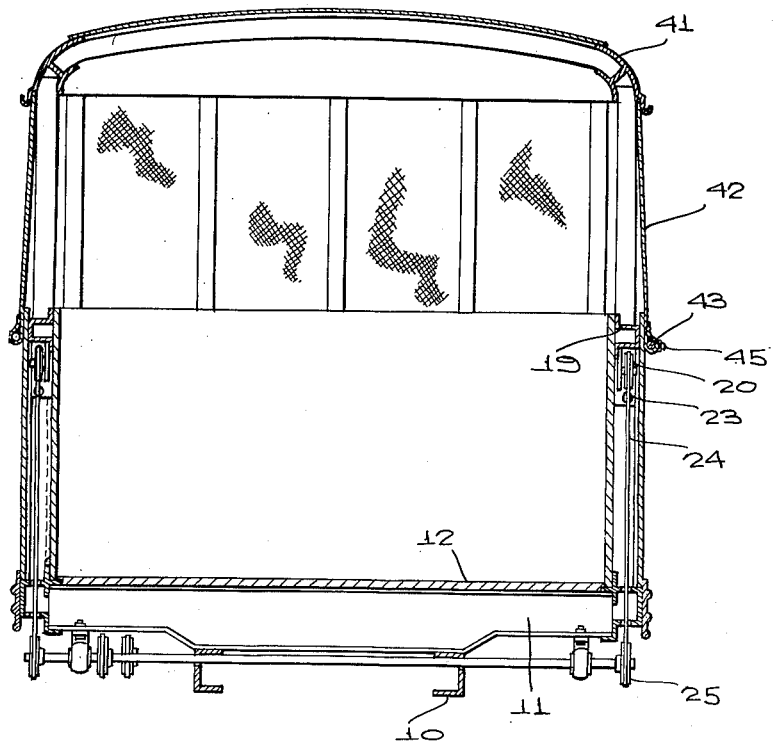
Figure 3:
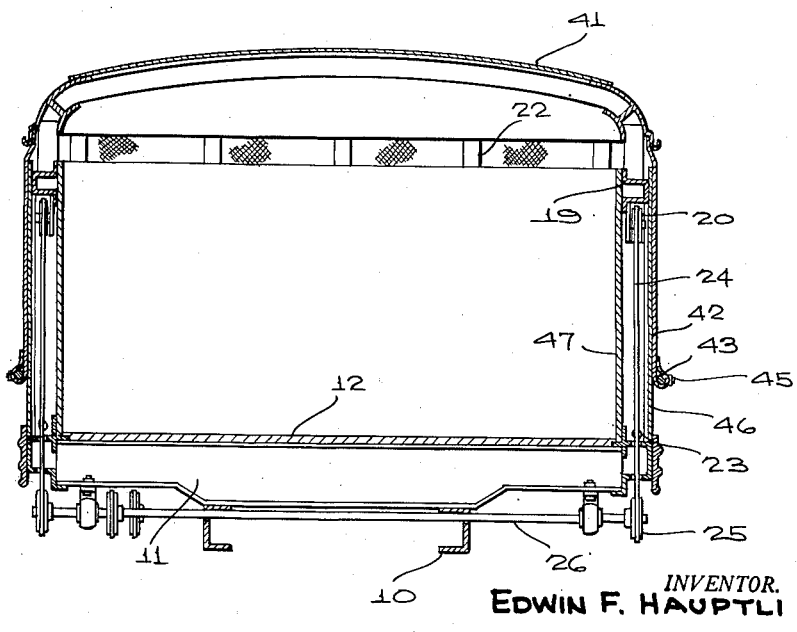

These and other objects and advantages of the present invention will be fully apparent from the following description when taken in connection with the annexed drawings, in which:

Figure 1 is an isometric view of the vehicle body of the present invention with the roof in raised position, Figure 2 is an end view in cross-section taken on line 2—2 of Figure 1, Figure 3 is an end view in cross-section similar to Figure 2 but showing the roof in lowered position, Figure 4 is a vertical view looking upwardly on line 4—4 of Figure 1, Figure 5 is a detailed view partially in cross-section and greatly enlarged as seen on line 5—5 of Figure 4, and Figure 6 is a detailed vertical view in cross-section on line 6—6 of Figure 1.

Referring in greater detail to the drawings in which like numerals indicate like parts throughout the several views, the present invention consists in a vehicle body, such as is used in a trailer and having a frame including longitudinal beams 10 and transverse beams 11 supporting a floor 12. A plurality of hollow posts extend around the sides and front end of the floor 12 and rise therefrom to form a 3-sided unitary skeleton structure. The two opposed corner posts 13 at the rear end of the floor 12 are fabricated of a larger size channel steel, aluminum, or other rigid material, than the other posts. The posts 14 next adjacent to the corner posts 13 are each provided with a longitudinally extending slot 15 in the wall facing the corner post 13, and a post 16 on each side of the floor intermediate the ends thereof is also provided with a longitudinally extending slot 17 in one of its walls.

Other posts 18 adjacent the front end of the floor 12 are similarly slotted. A rail 19 extends between the posts from one corner post to the other and connects the upper ends of the posts together.

A freely rotatable sprocket wheel 20 is dependingly supported upon the rail adjacent each of the posts 14, 16, and 18. Within each post is an extension, the extension in each post being shaped so as to slide easily within its associated post but to form when extended upwardly a rigid structure. The extension 21 within the corner post 13 is dimensioned larger than the other extensions, all of the extensions being formed of square steel tubing or the like. The extension 22 within each of the posts 14, 16, and 18 is provided with an aperture adjacent its lower end through which extends a bolt 23 securing the extension to the adjacent portion of an endless chain 24 which extends vertically between the adjacent posts and has its upper portion running over the adjacent sprocket wheel 20. The lower portion of each chain 24 extends below the floor 12 and is drivably engaged by one of the sprocket wheels 25 carried on each end of the shafts 26, 27, and 28, the shafts extending transversely of the floor with the shafts 26 and 27 adjacent and spaced from each end of the floor of the shaft 28 disposed intermediate the ends of the floor. A drive chain 29 runs over other sprocket wheels on each of the shafts 26 and 28 and connects those shafts for operation together and another drive chain 30 similarly connects other sprocket wheels on the shafts 27 and 28 so that when rotary movement is applied to any one shaft the other shafts will rotate.

Adjacent one side of the trailer floor is a drive means for the shafts 26 to 28 and consists in a short shaft 31 having a worm gear 32 in mesh with a gear 33 on a cross shaft 34 connected by a chain 35 and sprocket wheels 36 and 37 to the one shaft 27, an electric motor 38 is carried by the floor 12 and is connected to the short shaft 31 by a belt 39. A crank 40 on the outer end of the shaft 31 provides a means for manually operating the hoist mechanism provided by the chains and shafts above described.

A roof structure 41 extends between and over the upper ends of the extensions and is connected to the upper ends of the extensions for movement therewith. A flexible wall 42 depends from the roof 41 exteriorly of the extensions and extends around the sides and front of the trailer. A horizontally-disposed U-shaped bar 43 is secured in the lower end of the wall 42 and has its legs on each side of the trailer exteriorly thereof and its bight adjacent the front end of the trailer. Other posts 44 are provided with longitudinally extending slots on their outer walls and a bolt 45 connects the lower end of the associated extension to the bar 43, as seen in Figure 6. An outer panel 46 covers the posts on the outside of the trailer and an inner panel 47 covers the posts on the inside of the trailer.

The trailer is provided with wheels 48 and a parking dolly 49 of conventional design and structure.

In use, the trailer roof may be easily and speedily raised or lowered either using the electric motor 38 or by hand, using the crank 40. When in either the lowered or the raised position, the interior of the trailer may be closed by the half-doors 50 at the rear end of the trailer.

What is claimed is:

1. In a vehicle body having a floor, a plurality of hollow posts arranged in spaced relation along each of the sides and one end of said floor and connected together to form a three-sided unitary skeleton structure, an upright extension mounted within each of said posts for contractile and projectile movement, a rigid roof extending over the upper ends of said extensions and carried thereby, a rail carried by said posts, spaced rotatable sprocket wheels carried by said rail, a vertically arranged endless chain adjacent each of said sprocket wheels and having an upper portion carried by said sprocket wheel for movement thereon and having its lower portion disposed below said floor, means connecting the associated extension to the adjacent chain for movement therewith, a rotatable shaft arranged transversely of and below said floor adjacent each end thereof, another rotatable shaft arranged transversely of and below said floor intermediate the ends of said floor, a sprocket wheel carried on each end of each of said shafts drivably engaging the adjacent chain lower portion, and drive means carried by said floor operatively connected to said shafts for effecting the rotation of the latter.

2. In a vehicle body having a floor, a plurality of hollow posts arranged in spaced relation along each of the sides and one end of said floor and connected together to form a three-sided unitary skeleton structure, an upright extension mounted within each of said posts for contractile and projectile movement, a rigid roof extending over the upper ends of said extensions and carried thereby, the opposed ones of said posts adjacent each of the ends of said floor together with the opposed ones of said post intermediately of said floor ends each being provided with slots extending longitudinally in one wall thereof, a rail carried by said posts, a freely rotatable sprocket wheel carried by said rail adjacent each of said posts having a slot, a vertically arranged endless chain adjacent each of said sprocket wheels and having its upper portion carried by said sprocket wheel for movement thereover and having its lower portion disposed below said floor, means extending through the slot in each of said slotted posts connecting the associated extension to the adjacent chain for movement therewith, a rotatable shaft arranged transversely of and below said floor adjacent each end thereof, another rotatable shaft arranged transversely of and below said floor intermediate the ends of said floor, a sprocket wheel carried on each end of each of said shafts drivably engaging the adjacent chain lower portion, drive means carried by said floor operatively connected to said shafts for effecting the rotation of the latter, a vertical wall arranged exteriorly of said extensions dependingly carried by said roof, and means connecting said wall to said extensions adjacent the lower ends of the latter for movement therewith.

References Cited in the file of this patent
UNITED STATES PATENTS

| | | |
|---|---|---|
| 1,852,984 | Smith | Apr. 5, 1932 |
| 2,168,069 | Miller | Aug. 1, 1939 |
| 2,292,107 | Doepke | Aug. 4, 1942 |
| 2,520,698 | Sniezyk | Aug. 29, 1950 |
| 2,656,216 | Bobbroff | Oct. 20, 1953 |

FOREIGN PATENTS

| | | |
|---|---|---|
| 271,388 | Great Britain | May 26, 1927 |